G. G. LITTLE.
VALVE.
APPLICATION FILED JUNE 17, 1909.
961,505.
Patented June 14, 1910.
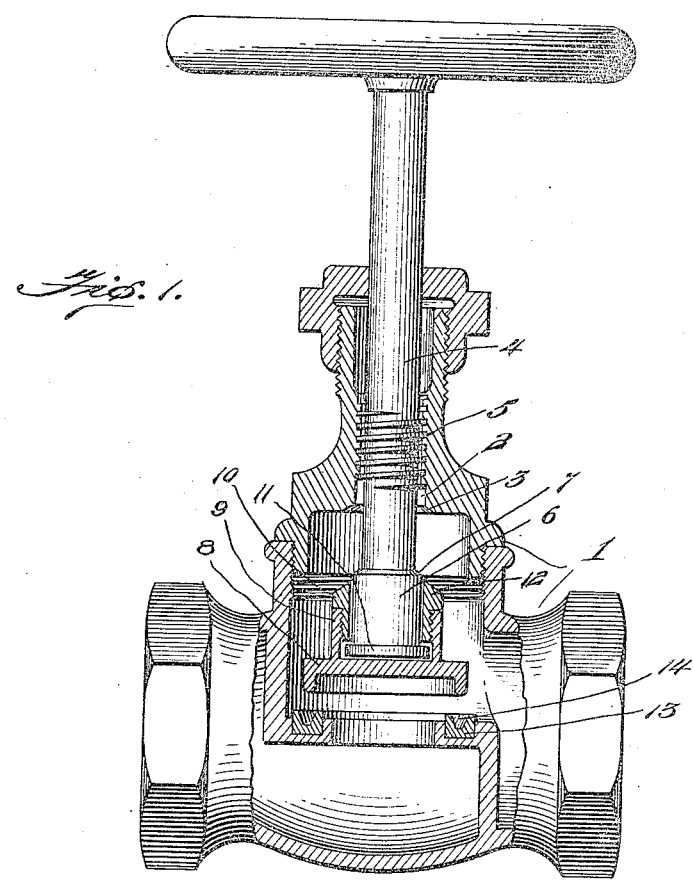
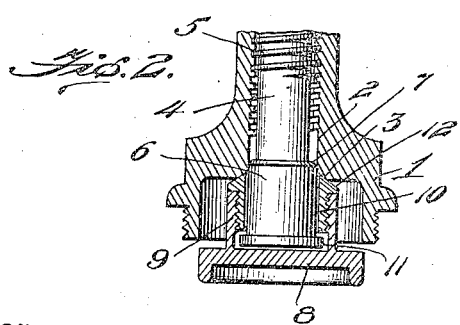
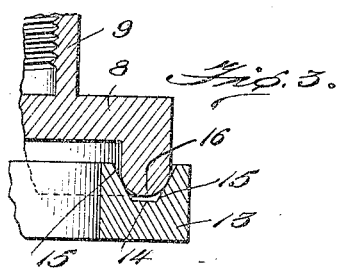
Witnesses
Inventor
G. G. Little
By
G. Ayres.
Attorney

UNITED STATES PATENT OFFICE.

GEORGE G. LITTLE, OF GULFPORT, MISSISSIPPI.

VALVE.

961,505.

Specification of Letters Patent. Patented June 14, 1910.

Application filed June 17, 1909. Serial No. 502,820.

*To all whom it may concern:*

Be it known that I, GEORGE G. LITTLE, a citizen of the United States, residing at Gulfport, in the county of Harrison and State of Mississippi, have invented certain new and useful Improvements in Valves, of which the following is a specification.

My invention relates to improvements in valves, and it consists in the constructions, combinations and arrangements herein described and claimed.

An object of my invention is to provide an improved valve which will insure a close and tight seating of the valve without necessitating the use of a packing.

A further object of my invention is to provide an improved valve construction, in which the valve will always engage its seat along a pair of concentric line contacts, thereby preventing leakage past the valve through wear of latter or its seat.

A further object of my invention is to provide an improved valve construction in which leakage of steam about the valve stem will be efficiently prevened, thereby eliminating the trouble and inconvenience incident to leaky valves and permitting convenient packing of the valve stem under a steam head.

In the accompanying drawings, forming a part of this application, and in which similar reference numerals indicate corresponding parts in the several views: Figure 1 is a central vertical section, partly in elevation, illustrating one embodiment of my invention; Fig. 2 is a detail section, showing the valve and its stem in their open position, and Fig. 3 is a fragmentary section, on a larger scale, clearly showing the engagement of the valve along a pair of concentric line contacts with the converging conical walls of the valve seat.

Referring to the drawings, 1 indicates any usual form of valve casing provided with a bore 2 terminating in an interior tapered valve seat 3. A valve stem 4 is threaded at 5 through said bore, and provided with a cylindrical enlargement 6 for closely fitting therein in the open position of the valve. The cylindrical enlargement 6 is provided with an inclined shoulder 7 for engaging the tapered seat 3 to guide said enlargement and insure its accurate centering in the bore 2. A valve 8 is provided with an axial flange 9 internally threaded for engagement by a nut 10, which latter slidably fits said cylindrical enlargement 6 and overlaps an annular flange 11 thereon for swiveling said valve to the spindle. The nut 10 is formed with a conical head 12 for firmly seating on the tapered seat 3 in the open position of the valve.

By the above described construction, the cylindrical enlargement 6 is positively guided into the closely fitting bore 2 and the conical head 12 of the nut drawn firmly to its seat 3 upon shifting the valve to its open position; said enlargement and conical head constituting simple and efficient means coöperating to insure proper positioning of said parts and for efficiently preventing leakage of steam about the valve stem when the valve is in open position.

A valve seat 13 is shown removably secured in the casing and provided with an annular groove 14 formed with opposing, converging conical walls 15. The valve 8 is provided with an annular lip 16 formed with an arc-shaped cross-section for engaging the opposed, converging conical walls 15 of said seat along circular line contacts.

This improved construction insures a tight and close seating of the valve under all practical conditions, thereby avoiding the necessity of employing a packing and insuring a tight seating of the valve without danger of jamming or distortion thereof.

I have illustrated and described a preferred and satisfactory construction, but changes could be made within the spirit and scope of my invention.

Having thus described my invention, what I claim as new and desire to secure by Letters-Patent is:

In a valve, the combination of a casing provided with a bore having an enlarged inner portion terminating in an interior tapered seat, a valve stem threaded through such bore and provided with a cylindrical enlargement for closely fitting within such enlarged portion of the bore, said cylindrical enlargement being provided with an inclined shoulder for engaging said tapered seat for guiding and centering said enlargement in such enlarged portion of the bore, a valve, a nut swiveling said valve to said stem and provided with a conical head for engaging said tapered seat upon entrance of said cylindrical enlargement into the enlarged portion of the bore in the open position of the valve, substantially as described.

In testimony whereof I affix my signature in presence of two witnesses.

GEORGE G. LITTLE.

Witnesses:
E. V. CRISPIN,
C. A. REYNOLDS.